United States Patent [19]

Matoba

[11] Patent Number: 5,255,018
[45] Date of Patent: Oct. 19, 1993

[54] IMAGE FORMING APPARATUS
[75] Inventor: Takeshi Matoba, Yokohama, Japan
[73] Assignee: Canon Kabushiki Kaisha, Tokyo, Japan
[21] Appl. No.: 707,019
[22] Filed: May 29, 1991
[30] Foreign Application Priority Data May 31, 1990 [JP] Japan ................... 2-139949

[51] Int. Cl.$^5$ ............................. G01D 15/06
[52] U.S. Cl. ..................... 346/140 R; 346/153.1; 346/160.1
[58] Field of Search ............ 346/21, 153.1, 74.2, 346/140 R, 155, 160.1; 355/245, 246, 271, 273, 274, 251–253; 358/300

[56] References Cited

U.S. PATENT DOCUMENTS

| 4,334,760 | 6/1982 | Rodger | 355/3 DD |
| 4,391,842 | 7/1983 | Huggins | 427/14.1 |
| 4,547,787 | 10/1985 | Kaneko et al. | 346/160 |
| 4,739,348 | 4/1988 | Ando et al. | 346/155 |
| 4,760,410 | 7/1988 | Kishi | 346/153.1 |
| 4,788,564 | 11/1988 | Ochiai | 346/160.1 X |
| 4,797,695 | 1/1989 | Konno et al. | 346/160.1 X |
| 4,831,394 | 5/1989 | Ochiai et al. | 346/160.1 |
| 4,887,103 | 12/1989 | Imai et al. | 346/160.1 |
| 4,896,625 | 1/1990 | Sakamoto et al. | 355/245 X |
| 4,916,469 | 4/1990 | Imai et al. | 346/150 |
| 4,943,819 | 7/1990 | Toma et al. | 346/160.1 |
| 4,989,021 | 1/1991 | Ochiai et al. | 346/160.1 |
| 5,006,898 | 4/1991 | Kobayashi et al. | 355/245 X |

FOREIGN PATENT DOCUMENTS

| 0342798 | 11/1989 | European Pat. Off. |
| 0463843 | 1/1992 | European Pat. Off. |
| 0046481 | 2/1988 | Japan | 355/245 |

Primary Examiner—Benjamin R. Fuller
Assistant Examiner—Alrick Bobb
Attorney, Agent, or Firm—Fitzpatrick, Cella, Harper & Scinto

[57] ABSTRACT

An image forming apparatus in which as image is formed. by utilizing a plurality of longitudinally arranged recording electrodes to which voltages for forming the image are applied and a movable endless recording medium arranged in confronting relation to the recording electrodes and by supplying toner between the recording electrodes and the recording medium. By preventing the toner in the vicinity of the recording electrodes from being compressed abruptly by the provision of a guide, the image quality is improved.

5 Claims, 13 Drawing Sheets

F I G. 8
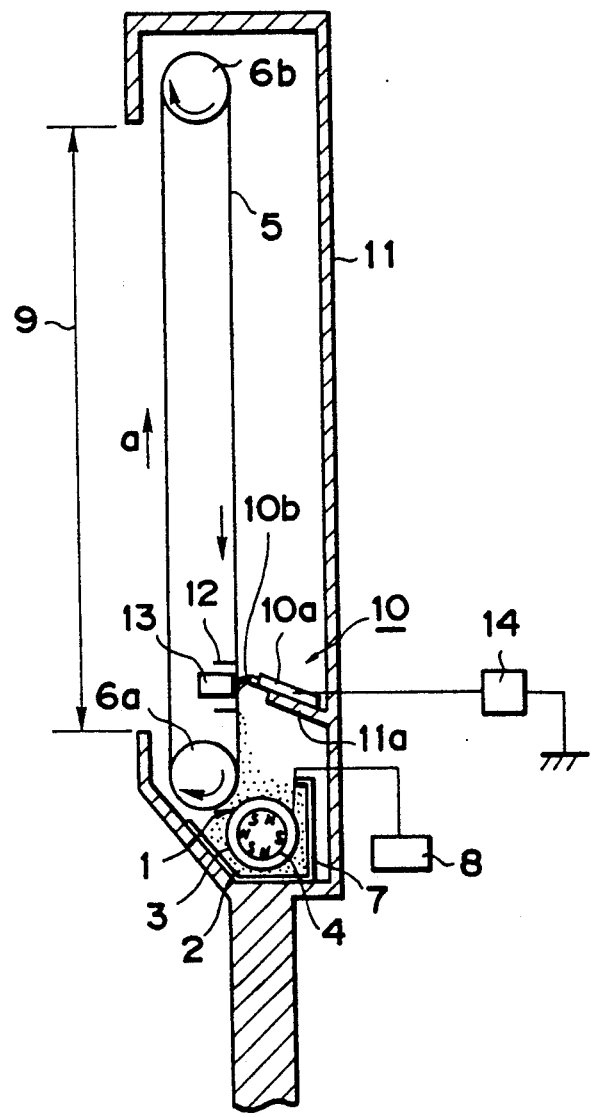

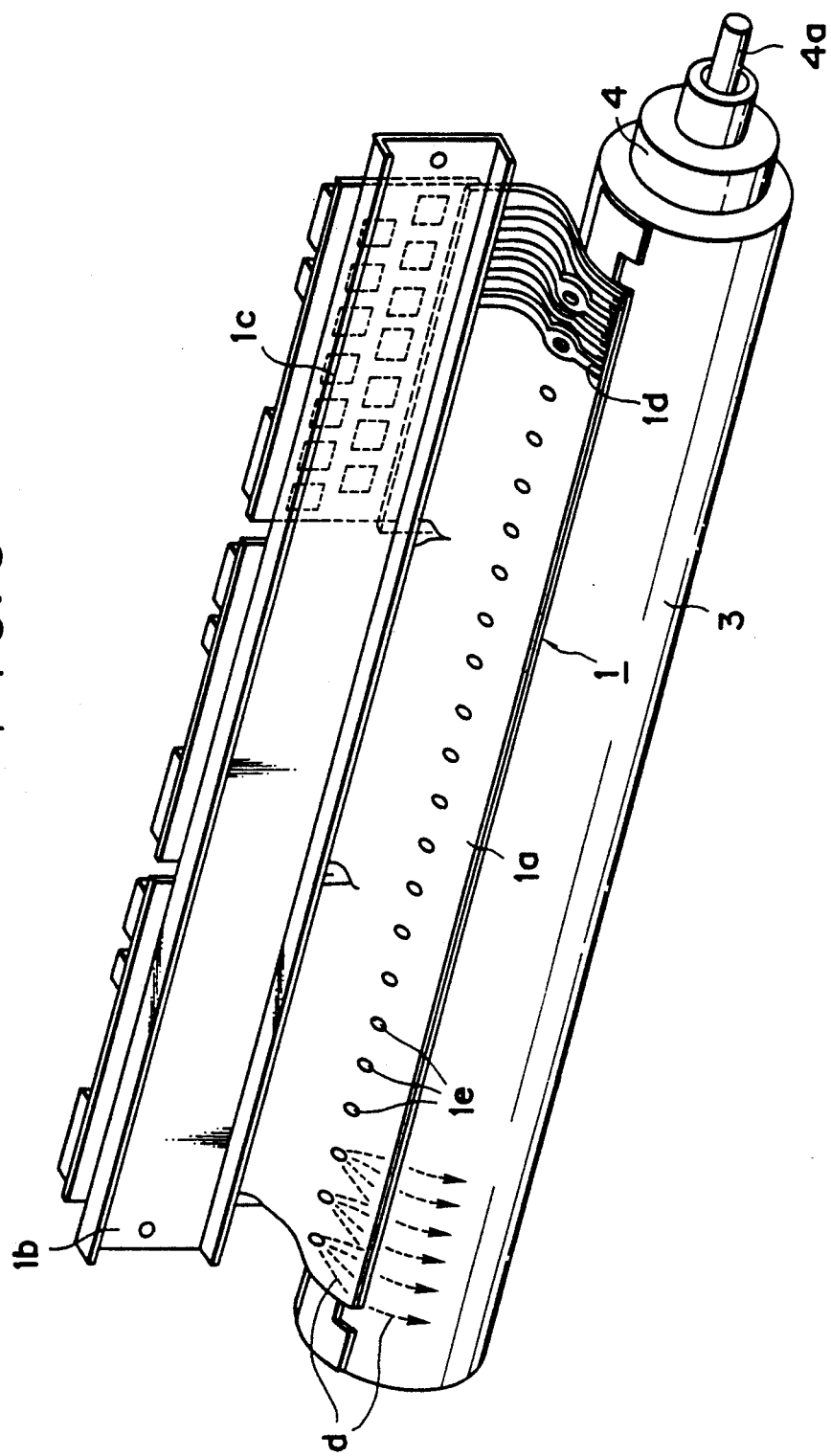

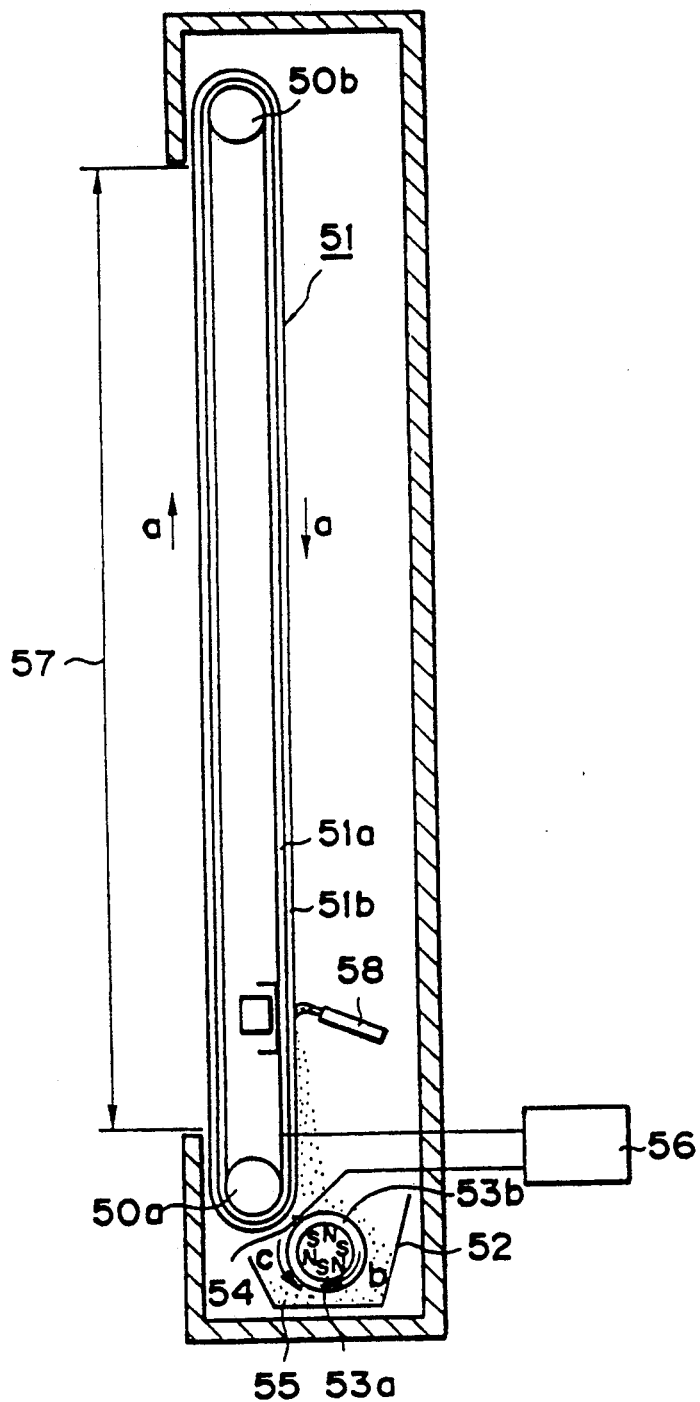

TONER SURFACE LINE WHEN FEED ROLLER 50a IS SUFFICIENTLY SEPARATED FROM SLEEVE 53b

IMAGE FORMING APPARATUS

BACKGROUND OF THE INVENTION

1. Field of the Invention

The present invention relates to an image forming apparatus wherein an image is formed by electrostatically causing developer to a recording medium.

2. Related Background Art

In the past, there have been proposed various apparatuses for forming an image in response to image formation, among which, an image forming apparatus in which conductive magnetic toner is used and an image is formed by electrostatically adhering the toner to a recording medium is already known.

For example, as shown in FIG. 14, in such a conventional image forming apparatus, a magnet roller 53a disposed in a developing device 52 is rotated in a direction b with respect to an endless recording medium 51 moved in a direction a by means of a drive feed roller 50a and a driven feed roller 50b, so that conductive magnetic toner 55 is fed in a direction c onto recording electrodes 54 densely formed on a sleeve 53b made of non-magnetic material. And, by applying a signal voltage between the recording electrodes 54 and a conductive layer 51a of the recording medium in response to image information from a record controlling portion 56, an image is formed on the recording medium by selectively and electrostatically causing the toner to adhere to an insulation layer 51b of the recording medium. For example, when the signal voltage of $+40$ V is applied from the toner controlling portion 56, the toner 55 adheres to the recording medium 51, whereas, when the signal voltage is 0 V (i.e., the voltage is not applied), the toner does not adhere to the recording medium. By repeating the application and non-application of the toner, the image is formed on the recording medium.

After the image formed on the recording medium is displayed at an image display area 57, the toner 55 adhering to the recording medium 51 is removed from the recording medium by means of a cleaning member 58 made of conductive carbon fibers, conductive resin or conductive rubber, with the result that the toner is dropped into the developing device 52 to be re-used in a next image forming process.

FIG. 15 is an explanatory view for explaining and showing an image forming portion in an enlarged scale. The recording electrode 54 is constituted by a flexible wiring member and is fixedly mounted on the surface of the sleeve 53b by means of a two sided adhesive tape and the like. A conductor exposed portion 54a constituting an electrode portion is formed on an end of the recording electrode 54 near the recording medium 51, and a through opening 54b is formed in the recording electrode for passing the toner 55. The dimension of the through opening 54b is so selected that the amount of toner left from between the recording medium 51 and the conductor exposed portion 54a becomes less than an amount of toner entering through the through opening 54b. Consequently, as shown in FIG. 15, the toner is accumulated ahead of the conductor exposed portion 54a as the toner 55 is moved in the direction c. The reason for accumulating the toner is to obtain an image having a desired density or more.

Now, the explanation will be continued. By dividing the surface of the sleeve 53b into a portion A (between the through opening 54b and the conductor exposed portion 54a, the center angle of sleeve 53b is $\theta$) and a portion B (between the conductor exposed portion 54a and the through opening 54b, the center angle of the sleeve 53b is $(2\pi - \theta)$). Incidentally, W denotes the total weight of the toner disposed on the sleeve; V denotes the toner feeding speed; $A_1$ denotes the cross-sectional area between the recording medium and the conductor exposed portion; $A_2$ denotes the area of the through opening; $\rho$ denotes the toner density; and D denotes the diameter of the sleeve.

With adequate separation between the recording medium 51 and the sleeve 53b, the toner 55 on the surface of the sleeve 53b is moved in a steady state by rotating the magnet roller 53a.

Then, the recording medium 51 approaches the sleeve 53b to set a predetermined gap between the recording medium 51 and the conductor exposed portion 54a. After a time t elapses, the toner amounts $W_A$, $W_B$ disposed on the portions A and B, respectively, will be as follows:

At the portion A, $$W_A = W \times \theta/2\pi + \rho(A_2 - A_1)Vt;$$

At the portion B, $$W_B = W \times (2\pi - \theta)/2\pi - \rho(A_2 - A_1)Vt.$$

Now, since the toner 55 is circulated on the sleeve 53b, when the required for effecting one revolution of the sleeve 53b is $t_1$, the following equation is obtained:

$$t_1 = \pi D/V.$$

And, after the time $t_1$ is elapsed, the toner amounts $W_{At}$, $W_{Bt}$ will be as follows:

$$W_{At} = W \times \theta/2\pi + \rho(A_2 - A_1)\pi D; \text{ and}$$

$$W_{Bt} = W \times (2\pi - \theta)/2\pi - \rho(A_2 - A_1)$$

Here, $A_2 > A_1$. Thus, the toner amounts will be in the steady state.

FIG. 16 shows, in an enlarged scale, that the toner 55 accumulated in the image forming portion is in a steady state.

Now, when the starting point and the terminal point of an image effective area along the toner feeding direction are E and F at the side of the recording medium 51, respectively, and are G and H at the side of the conductor exposed portion 54a, respectively, the force exerted on the toner in the image effective area EFGH will be considered.

When the configuration of the image effective area EFGH is a quadrilateral EFGH as shown in FIG. 17, and the angle between a line segment EF and a line segment GH is $\theta_1$ the quadrilateral EFGH will be a portion of a wedge directed toward the toner feeding direction. When a force P acts in a direction perpendicular to the line segment EG, the toner 55 in the quadrilateral EFGH will be subjected to forces $P/2 (\sin \theta_1/2)$ directed toward a direction perpendicular to the line segments EF, GH, respectively.

Since the toner 55 is accumulated ahead of the conductor exposed portion 54a and the weight thereof becomes $W_{At}$ after the time $t_1$ has elapsed as mentioned above, the force P resembles a force generated when an object having the weight of $W_{At}$ strikes a wall at a speed of V (i.e., $P \propto W_{At}V$). Thus, when the toner 55 in the image effective area EFGH is accumulated at the conductor exposed portion 54a, the toner is subjected to a compression force of P/2 (sin $\theta_1/2$).

On the other hand, as the toner is compressed, the toner resistance tends to be reduced, as shown in FIG. 18. That is to say, when the toner in the image effective area EFGH accumulates at the conductor exposed portion 54a, the toner resistance $R_1$ is reduced more than that when the toner is not accumulated, with the result that the electrostatic attraction force $F_E$ is increased. By decreasing the toner resistance $R_1$ to be lower than a predetermined value $R_M$, the electrostatic attraction force $F_E$ acting on the toner chain becomes greater than the magnetic force $F_M$ of the magnet roller 53a tending to hold the toner chain at the side of the sleeve 53b, thereby increasing the amount of toner 55 attracted to the recording medium 51.

However, with the above-mentioned arrangement, since the toner is accumulated to reduce the toner resistance $R_1$ lower than the predetermined value $R_M$, the toner speed V must be set above a predetermined value $V_M$ and the gap area $A_2$ must be set below a predetermined value $A_{2M}$. The reason for this is that, when f is a function representative of the toner resistance, the following relation is established:

$$f\{P/2(\sin \theta_1/2)\} = f\{w_A T V/\sin \theta_1/2)\}$$
$$= f\{g(A_2 - A_1)V/(\sin \theta_1/2)\} < R_M.$$

Accordingly, the driving force of the motor required for driving the magnet roller 53a to feed the toner must be increased to be more than a predetermined level, thus increasing the power consumption and making the apparatus large-sized.

Further, since the dimension of the gap between the recording medium 51 and the conductor exposed portion 54a has, of course, an upper limit, the constructional elements such as the drive feed roller 50a, sleeve 53b and the like must be manufactured with high accuracy, thus increasing the manufacturing cost. In addition, when the longitudinal dimension of the apparatus is increased, since the manufacturing accuracy of the elements such as the drive feed roller 50a, sleeve 53b and the like often decreases, the gap between the recording medium 51 and the conductor exposed portion 54a must be set to have a greater value. In this case, however, since the resistance $R_1$ of the toner chain is increased in proportion to the increase in the gap value, it is necessary to devise for obtaining the relation $R_1 \leq R_M$.

In order to obtain such a relation conventionally, the toner feeding speed V may be increased, or the vertex angle $\theta_1$ of the wedge having the quadrilateral shape EFGH may be decreased by increasing outer diameters of the drive feed roller 50a and the sleeve 53b to increase the toner compressing force. However, in the former case, the driving force of the motor for driving the magnet roller 53a must be increased, with the result that the motor becomes large-sized, thus making the apparatus itself bulky. On the other hand, in the latter case, i.e., when the outer diameters of the drive feed roller 50a and the sleeve 53b are increased, the recording condition is improved at the conductor exposed portion 54a. However, it is difficult to remove the toner chain from the sleeve 53b immediately after the recording operation, with the result that the area sweeping the toner 55 adhered to the recording medium 51 is increased, thus creating an uneven image.

SUMMARY OF THE INVENTION

An object of the present invention is to eliminate the above-mentioned conventional drawbacks and to improve the image quality.

In order to achieve the above object, the present invention provides an image forming apparatus comprising a plurality of longitudinally arranged recording electrodes to which voltages for forming an image area are applied; a movable endless recording medium arranged in confronting relation to the recording electrodes; a developer supplying means for supplying conductive powder developer between the recording electrodes and the recording medium; and a guide means for regulating the movement of the developer so that the developer so supplied is not abruptly compressed at an upstream side of the recording electrodes.

BRIEF DESCRIPTION OF THE DRAWINGS

FIG. 8 is a sectional view for showing the schematic construction of an image forming apparatus;

FIG. 9 is a perspective view of recording electrodes;

FIGS. 14 to 18 are explanatory views for explaining a conventional image forming apparatus.

DETAILED DESCRIPTION OF THE PREFERRED EMBODIMENTS

Figure 1:
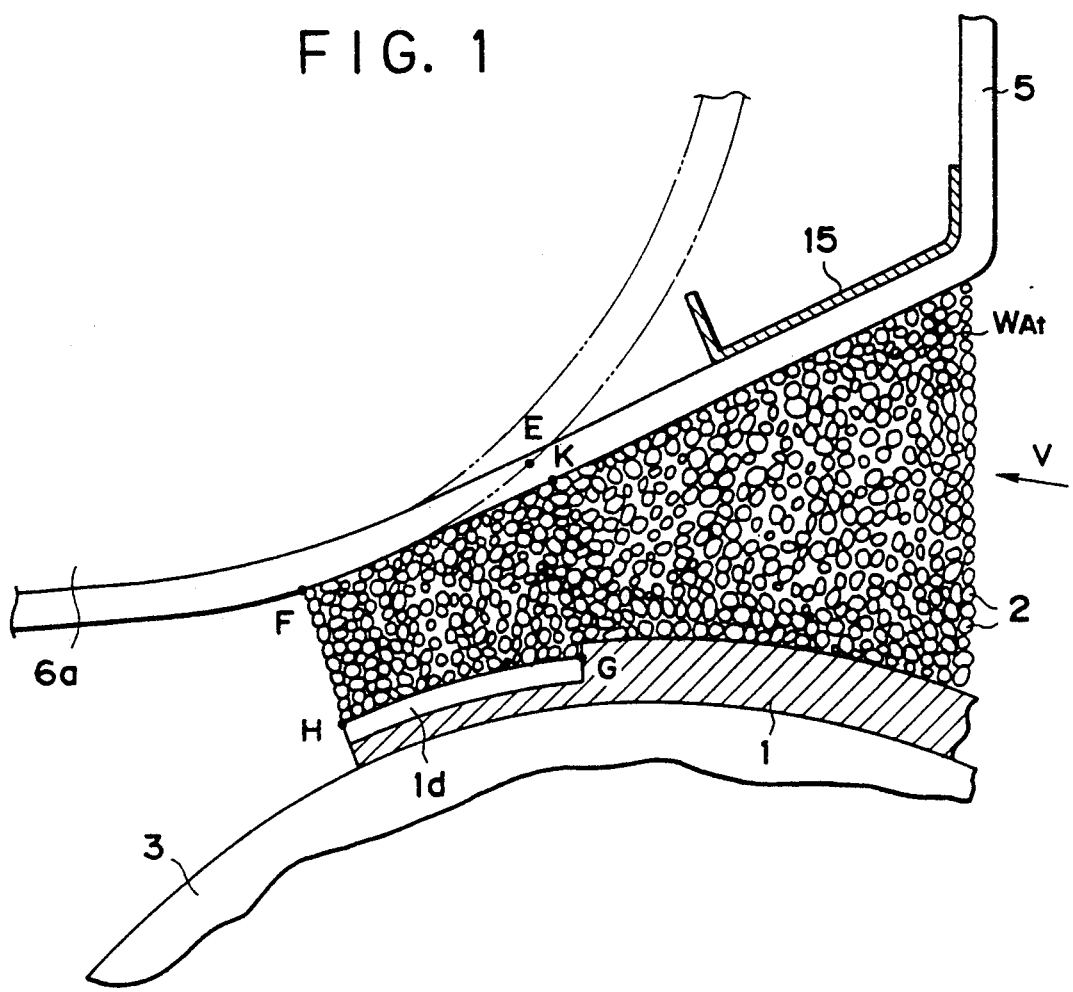
FIG. 1 is an enlarged sectional view of an image forming portion.

The present invention will now be explained in connection with a preferred embodiment with reference to the accompanying drawings.

First of all, the construction of an image forming apparatus of the present invention will be briefly explained with reference to FIGS. 8 to 10.

In FIG. 8, the reference numeral 1 denotes a recording electrode assembly for applying a voltage to developer in response to image information. The recording electrode assembly 1 adheres, by two-sided adhesive tape, to an outer peripheral surface of a non-magnetic cylinder (referred to as "sleeve" hereinafter) 3 having an outer diameter of 40 mm and acting as a developer supplying means for supplying conductive magnetic black developer (referred to as "toner" hereinafter) 2 having the volume resistivity of $10^3$–$10^9$ $\Omega$cm and an average particle diameter of 8–15 $\mu$m.

As shown in FIG. 9, the recording electrode assembly 1 includes a plurality of recording electrodes disposed on a flexible print board 1a and closely spaced apart along the axial direction of the print board. The recording electrodes are connected to electrode drivers 1b held on a support plate 1c so that a recording voltage of 20–40 V can be applied to each recording electrode. Each recording electrode is provided at its free end with a conductor exposed portion 1d which contributes to the recording operation. The electrode driver 1c may be, for example, a VFD driver (MSG 1163 manufactured by Oki Electric Company, Japan). Further, a plurality of through holes 1e for passing the toner are formed in the print board 1a along an axial direction of the sleeve 3. The toner 2 conveyed on the sleeve 3 in directions shown by the arrows d passes through the through holes 1e to reach the conductor exposed portions 1d of the recording electrodes.

A rotary magnet 4 having 16 polarities and a magnetic flux density (immediately above the magnet) of 900-1100 Gauss is coaxially attached to the sleeve 3. The rotary magnet 4 is rotatably driven around a shaft 4a at a speed of 1400-1500 rpm by means of a drive motor (not shown), so that the toner 2 is conveyed along the outer peripheral surface of the sleeve 3 by an alternating magnetic field generated by the rotary magnet 4. The sleeve 3 and the rotary magnet 4 are contained in a developing device 7.

In the proximity of the recording electrode assembly 1, there is disposed an endless recording sheet (recording medium) 5 on which an image is formed by electrostatically causing the toner 2 to adhere thereto and a portion of which is closely spaced apart from the recording electrode assembly by a distance of 0.6-0.3 mm. The recording sheet 5 is wound around and entrained by a pair of rollers (lower drive roller 6a and upper tension roller 6b) each having a diameter of 30 mm. The drive roller 6a is driven by a drive motor (not shown) to shift the recording sheet 5 to a speed of about 130 mm/sec in a direction shown by the arrow a in FIG. 8.

Figure 10:
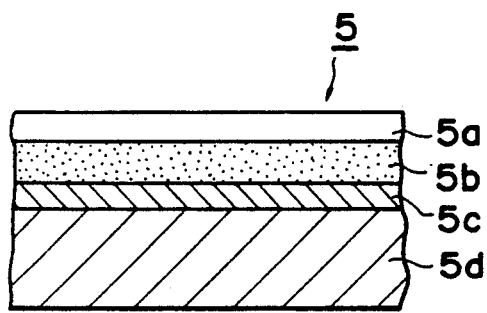
FIG. 10 is an enlarged sectional view of a portion of the recording electrode.

As shown in FIG. 10, the recording sheet 5 comprises an outer layer 5a made of transparent material consisting of butylal resin or urethane resin as a main component and having a thickness of 1-5 μm and a volume resistivity of $10^9$-$10^{13}$ Ωcm, colored layer 5b comprised of colored inorganic material and binder (acrylic resin, plastic resin) and having a thickness of 5-10 μm and a volume resistivity of $10^2$-$10^5$ Ωcm, a conductive layer 5c having a thickness of about 800 Å and a volume resistivity of $10^0$-$10^2$ Ωcm on which aluminum or ITO (oxide of indium and tin) for providing the conductivity, is provided and a substrate layer 5d made of plastic resin such as polyethylene terephthalete, polyethylene, polypropylene or the like, these layers 5a-5d being laminated.

The outer layer 5a and the colored layer 5b are electrically insulated from each other, and, as the inorganic material for the colored layer 5b, $TiO_2$ or $Al_2O_3$ is used to provide a white background of a screen.

In FIG. 8, a record controlling portion 8 for applying voltages corresponding to image information to the recording electrodes 1 applies a signal voltage corresponding to the image information to the conductive layer 5c of the recording sheet 5 to electrostatically cause the toner 2 to adhere to the outer layer 5a, thus forming an image thereon.

The reference numeral 9 denotes an image display portion for displaying the image formed on the recording sheet 5; and 10 denotes a cleaning member attached to a rear wall 11 of the apparatus via a support member 11a. The cleaning member 10 is constituted by a cleaner body 10a and a soft conductive brush 10b. By causing the brush 10b to slidingly contact the recording sheet 5 with appropriate orientation and distance, the toner 2 adhering to the recording sheet 5 can be removed from the recording sheet onto the non-magnetic cylinder 3. The cleaning member 10 may be made of carbon fibers, soft conductive plastic compound (polyethylene, polypropylene), urethane rubber or silicone.

On an opposite side of the cleaning member 10 with respect to the recording sheet 5, there are arranged a non-magnetic member 12 for supporting the recording sheet 5 and a magnet 13. Further, a power source 14 can apply a voltage having a polarity opposite to those of the charges generated due to the frictional contact between the cleaning member 10 and the recording sheet 5, to the cleaning member 10.

The toner 2 adhering to the peripheral surface of the sleeve 3 by the action of the rotary magnet 4 passes through the through holes 1e and is fed onto the recording electrodes 1. In this case, by applying the recording voltage of about 30 V to the recording electrodes in response to the image information, the toner 2 can adhere to the recording sheet 5 to form the image. Incidentally, the toner 2 on the recording electrodes 1 which did not contribute to form the image is dropped through recesses 3a, so as not to interface with the image formed on the recording sheet 5.

The image formed on the recording sheet 5 is displayed at the display portion 9 when the recording sheet 5 is shifted in the direction a by means of the drive roller 6a. The recording sheet 5 passing through the display portion 9 is swept by the cleaning member 10, so that the toner 2 and the charges are removed from the recording sheet. The removed toner 2 drops on the sleeve 3 to be re-used.

Next, the construction of the image forming portion will be explained with reference to FIGS. 1 to 7.

As mentioned above, since the amount of toner entering into the image forming portion through the through holes 1e is greater than the amount of toner leaving the image forming portion through the gap between the recording sheet 5 and the conductor exposed portions 1d, the toner 2 is accumulated ahead of the conductor exposed portions 1d of the recording electrodes 1. This is effective to increase the toner density for obtaining the image having a desired image density.

In this way, the reasons why the image density is increased when the toner is accumulated are that (1) the amount of toner contacting the image effective area of the recording sheet 5 is increased and that (2) the electrostatic attraction force between the recording sheet 5 and the toner 2 is increased to increase the amount of toner adhering to the recording sheet 5. Now, these reasons will be fully explained in comparison with the case where the toner is not accumulated. The first reason why the amount of toner contacting the image effective area of the recording sheet 5 is increased are as follows.

Figure 3:
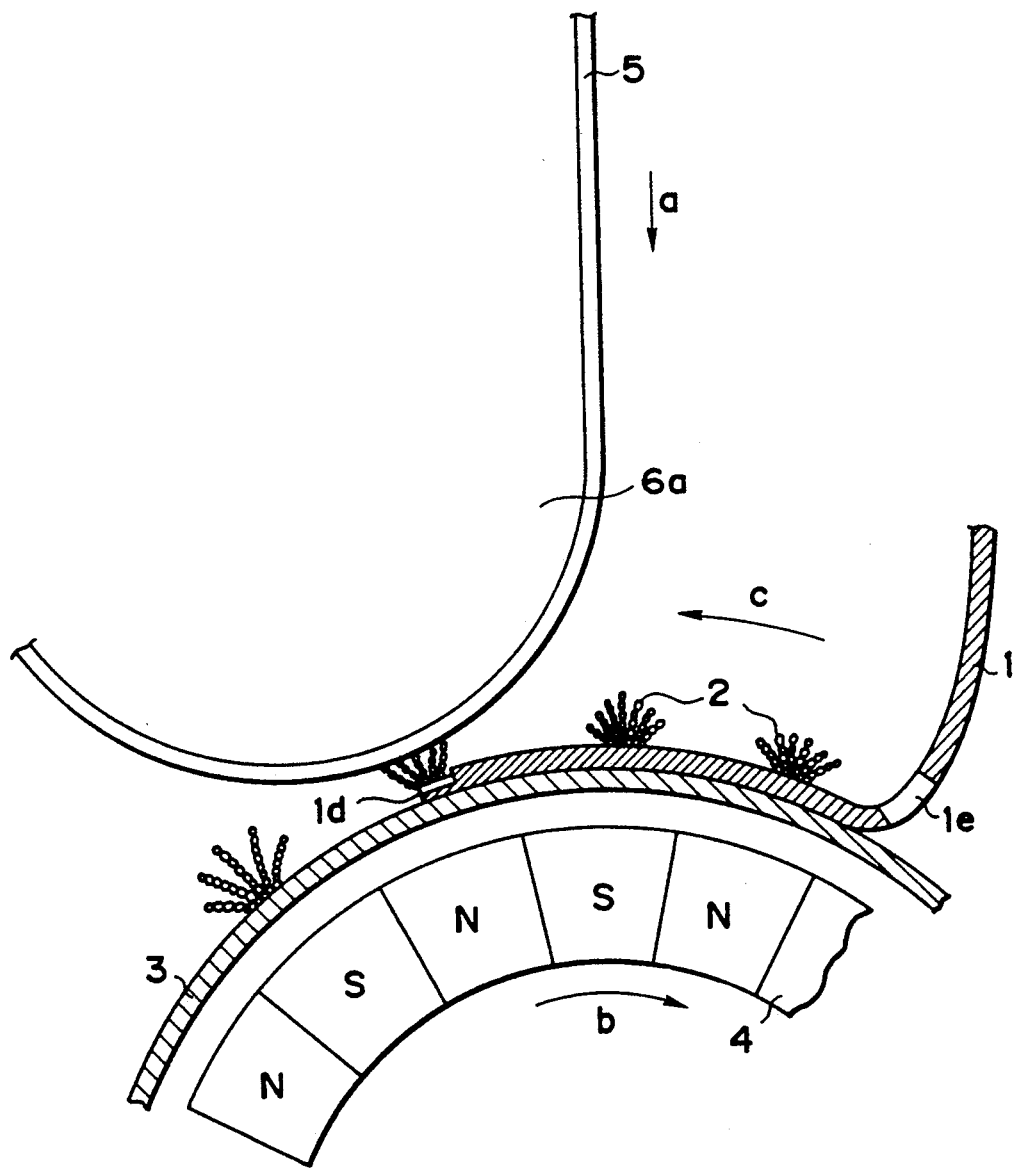
FIGS. 3 and 4 are sectional views for explaining a principle of an operation of the image forming portion.

The toner 2 on the conductor exposed portions 1d forms toner chains along the lines of magnetic force generated by the rotary magnet 4. In this case, since the distance between the surface of the rotary magnet 4 and the recording sheet 5 is greater than the distance between the surface of the rotary magnet 4 and the conductor exposed portions 1d, the magnetic flux density on the recording sheet 5 is weaker than that on the conductor exposed portions 1d, with the result that, as shown in FIG. 3, the toner chains are flared on a surface of the recording sheet 5. Under this condition, when the voltage corresponding to the image information is applied between the conductor exposed portions 1d and the conductive layer 5c of the recording sheet 5, since there arise regions where the free ends of the toner chains do not contact the recording sheet 5 on the image effective area of the recording sheet facing to the conductor exposed portions 1d, the image density will be reduced when the all black image is formed.

Figure 4:
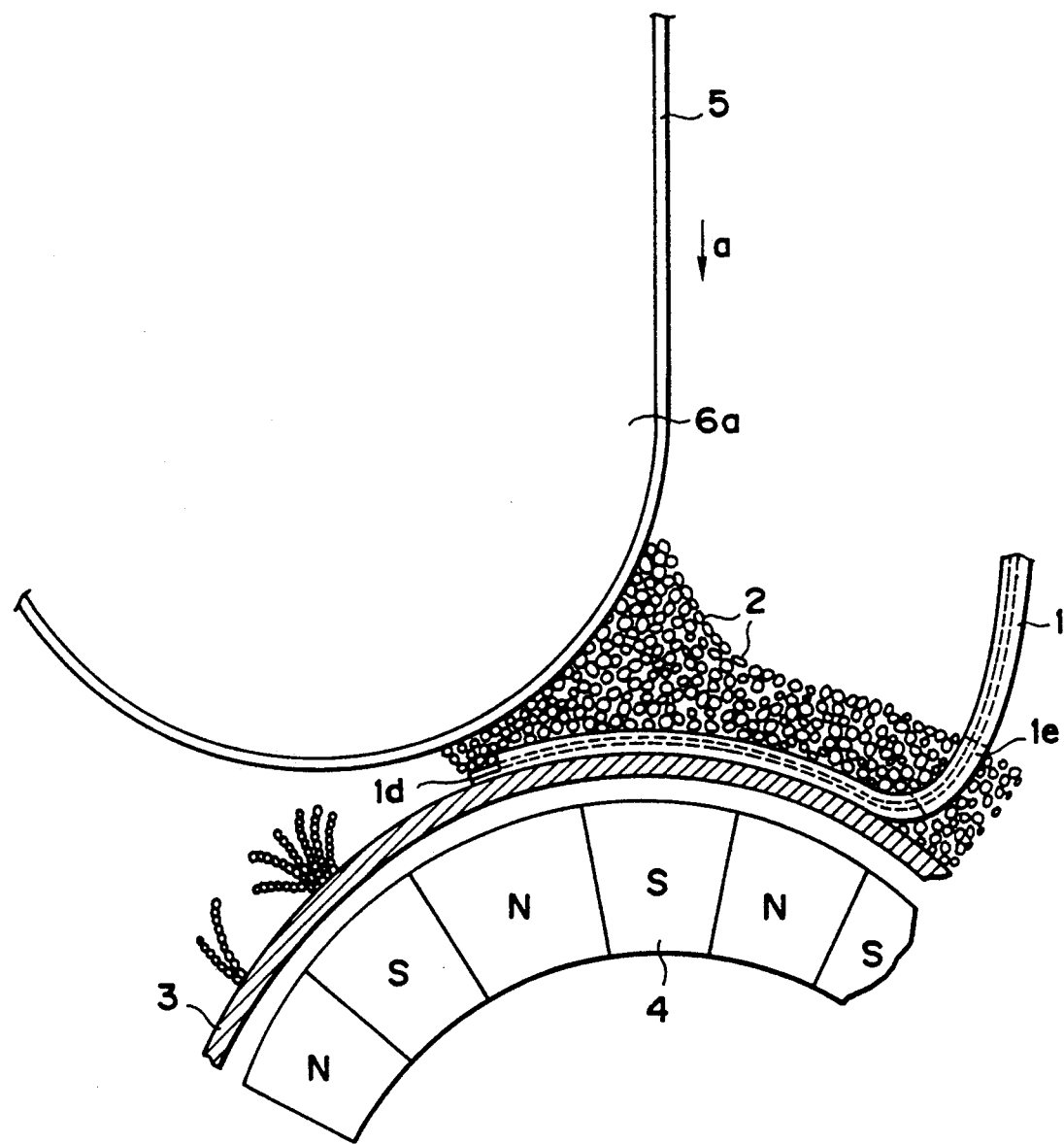

Thus, as shown in FIG. 4, when the toner 2 is accumulated ahead of the conductor exposed portions 1d as the toner is conveyed, since the toner can also enter into the regions where the free ends of the toner chains do not contact the recording sheet 5 on the image effective area, the image density will be increased even when the all black image is formed. The second reason why the electrostatic attraction force between the recording sheet 5 and the toner 2 is increased is as follows.

Figure 5:
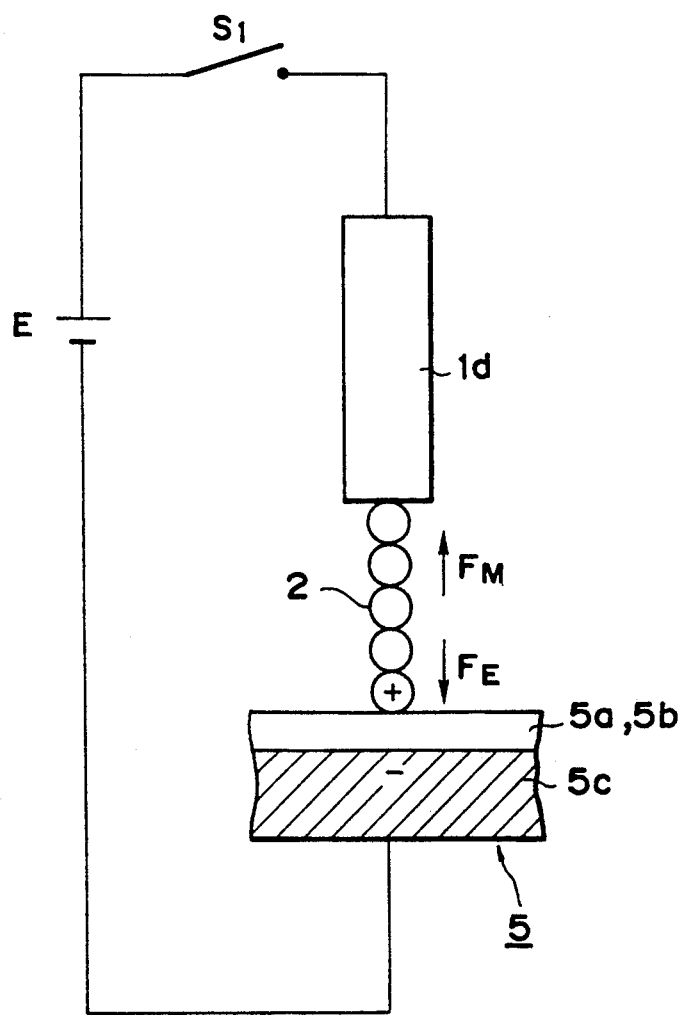
FIGS. 5, 6 and 7 are schematic explanatory views therefor.

FIG. 5 is a schematic explanatory view of the image forming portion showing the conductor exposed portion 1d connected to the recording sheet 5 by the toner chain.

When a switch $S_1$ is closed to apply a plus charge to the toner 2, a minus charge is led to the conductive layer 5c of the recording sheet 5, with the result that an electrostatic attraction force $F_E$ is generated between the toner 2 and the recording sheet 5. On the other hand, the toner chain is subjected to a force $F_M$ directly opposite to the electrostatic attraction force $F_E$, by means of the magnetic field of the rotary magnet 4. By selecting the parameters to have the relation $F_E > F_M$, the toner on the free end of the toner chain can electrostatically adhere to the surface of the recording sheet 5.

Figure 6:
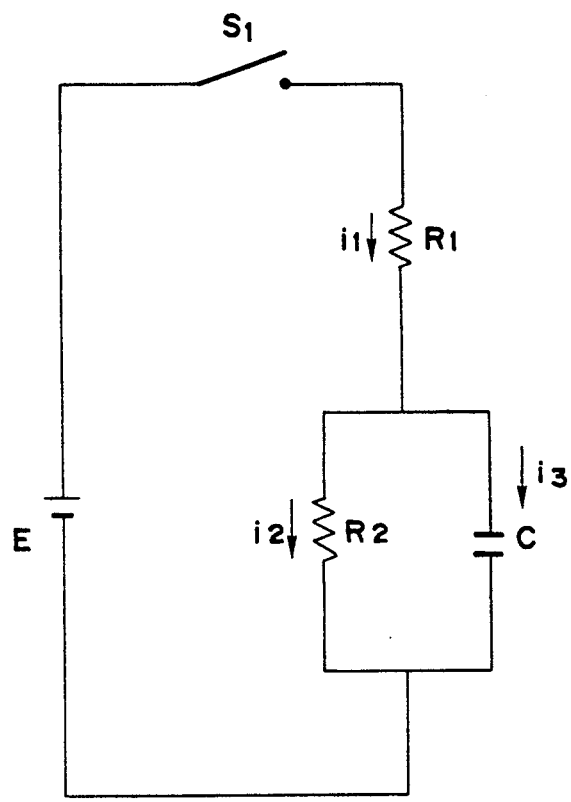

The above-mentioned electrostatic attraction force $F_E$ will now be further considered. FIG. 6 shows the image forming portion as an imaginary electric circuit. In FIG. 6, $R_2$ denotes the conductor resistance of the toner chain between the recording sheet 5 and the recording electrode I; $R_2$ denotes the resistance of the recording sheet 5 as the conductor; C denotes the electrostatic capacity of the recording sheet 5 as the dielectic; E denotes the recording voltage; and $i_1$, $i_2$, $i_3$ denote currents flowing through the resistors $R_1$, $R_2$ and capacitor C, respectively.

When the switch $S_1$ is turned ON, the following relations are established:

$$R_1 i_1 + R_2 i_2 = E,$$

$$1/C \int i_3 dt = R_2 i_2.$$

When the time t elapse after the switch $S_1$ has been turned ON, the voltage Ec applied to both ends of the capacitor C will be as follows:

$$Ec = R_2 i_2 = R_2 E/(R_1 + R_2)(1 - \epsilon^{-\frac{R_1+R_2}{CR_1R_2}}).$$

Figure 7:
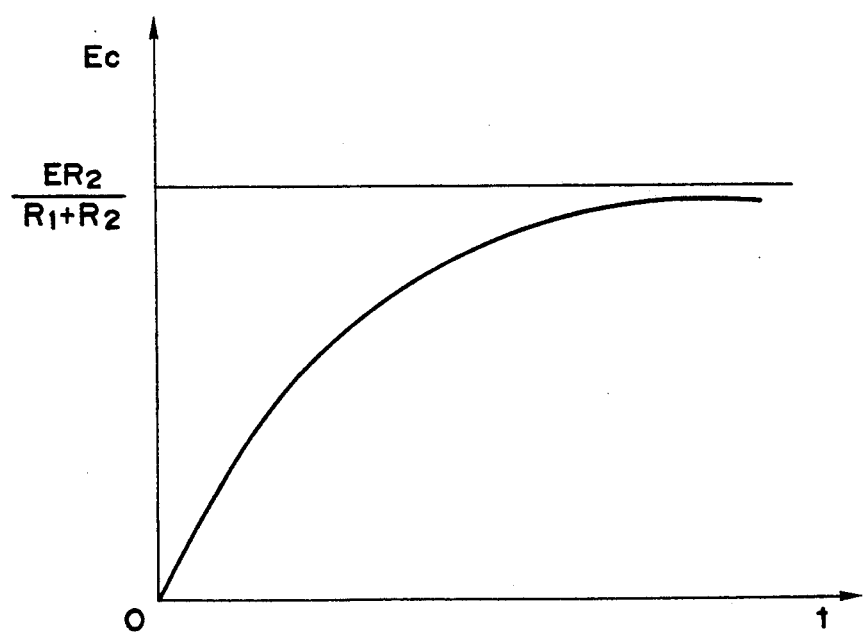

This is shown as a graph in FIG. 7, where, when $t = \infty$ (infinity), the voltage Ec will be constant.

Now, since $Ec = R_2 E/(R_1 + R_2)$, it can be understood that the smaller the conductor resistance $R_1$ of the toner chain, the greater the voltage Ec applied to both ends of the capacitor. Further, the amount Q of the charges accumulated on both polarities of the capacitor (Q=CEc) is increased as the voltage EC increases.

Further, since the electrostatic attraction force $F_E$ between the charges accumulated on both polarities of the capacitor C is $Q^2/2\epsilon_0 S$, the value $F_E$ becomes greater as the value Q is increased. If the minimum voltage Ec required for maintaining the normal image quality is $E_M$, since $E_M \leq R_2 E/(R_1 + R_2)$, the following relation is established:

$$R_1 \leq R_2(E/E_M - 1) = R_M.$$

In order to reduce the conductor resistance $R_1$ below the regulated value $R_M$, the toner is accumulated ahead of the conductor exposed portions 1d as mentioned above.

Next, the image effective area when a guide member 15 is mounted in the vicinity of the image forming portion of the image forming apparatus will be explained with reference to FIGS. 1 and 2 in connection with the image formation performed under the above-mentioned conditions.

Figure 2:
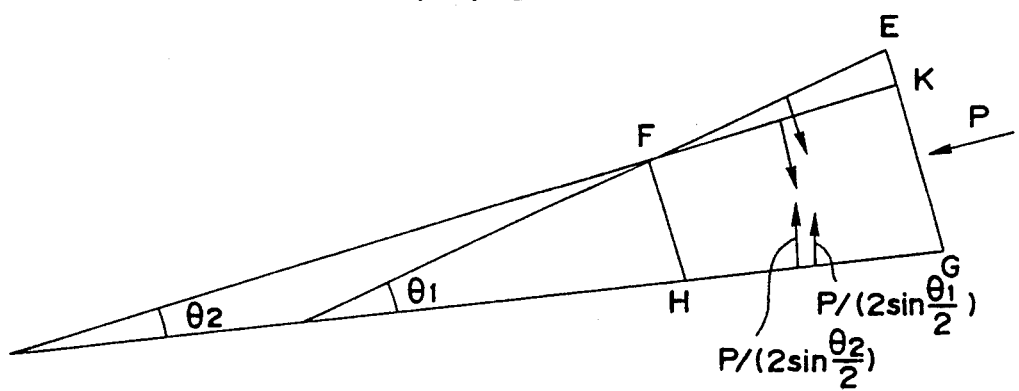
FIG. 2 is an explanatory view for explaining an image forming effective area.

In FIG. 1, the guide member (guide means) 15 is disposed in the vicinity of the image forming portion to regulate the flow-in of the toner 2. The guide member 15 regulates the shifting direction of the recording sheet 5 by deviating a portion of the recording sheet from the drive roller 6a just on this side of the image forming portion and also indirectly regulates the amount of the toner flowing into the image forming portion, via the recording sheet 5.

When the guide member 15 is used, an angle $\theta_2$ between line segments KF, GH of the image effective area KFHG is smaller than the angle $\theta_1$ between the line segments EF, GH of the image effective area EFGH when the guide member is not used, by 20-40%. Accordingly, as shown in FIG. 2, when the toner 2 in the image effective area KFGH is subjected to the weight $W_{At}$ of the accumulated toner and a force P due to the toner feeding speed V from a direction perpendicular to the line segment KG, the toner compressing forces $P/(2 \sin \theta_2/2)$ acting on the toner from the directions perpendicular to the line segments KF, GH become greater than the toner compressing forces $P/(2 \sin \theta_1/2)$ acting on the image effective area EFHG.

Therefore, as in the conventional example, since the conductor resistance $R_1$ of the toner chain is decreased to increase the electrostatic attraction force $F_E$ for attracting the toner 2 toward the recording sheet 5, it is possible to increase the image density.

Further, it is possible to increase the distance of the gap between the recording sheet 5 and the recording electrodes 1 within a range wherein the conductor resistance of the toner 2 is below the regulated value a decrease in the resistance of the toner due to the increase in the toner compressing force plus (+) increment in the resistance due to the increase in the gap distance $\leq$ regulated value $R_M$), while keeping the toner feeding speed V constant. Thus, since critical manufacturing accuracy of the drive feed roller 6a, sleeve 3 and the like is not required, the apparatus can be manufactured cheaply.

Further, when the longitudinal dimension of the apparatus is increased, although the gap distance between the recording sheet 5 and the recording electrodes 1 must be increased, by maintaining the value of the conductor resistance $R_1$ of the toner chain increasing in proportion to the increase in the gap distance below the regulated value $R_M$, it is possible to reduce the increase in the toner feeding speed V and outer diameters of the drive feed roller 6a and sleeve 3. Thus, the power sources for the rollers can be small-sized to reduce the power consumption, thus making the apparatus light-weight.

Further, since the area of the recording sheet 5 swept by the toner 2 adhered to the sleeve 3 after the image forming operation can be reduced, it is possible to reduce the unevenness in the image. In addition, by varying the toner feeding speed V, the resonance point in the whole apparatus can be avoided.

Figure 11:
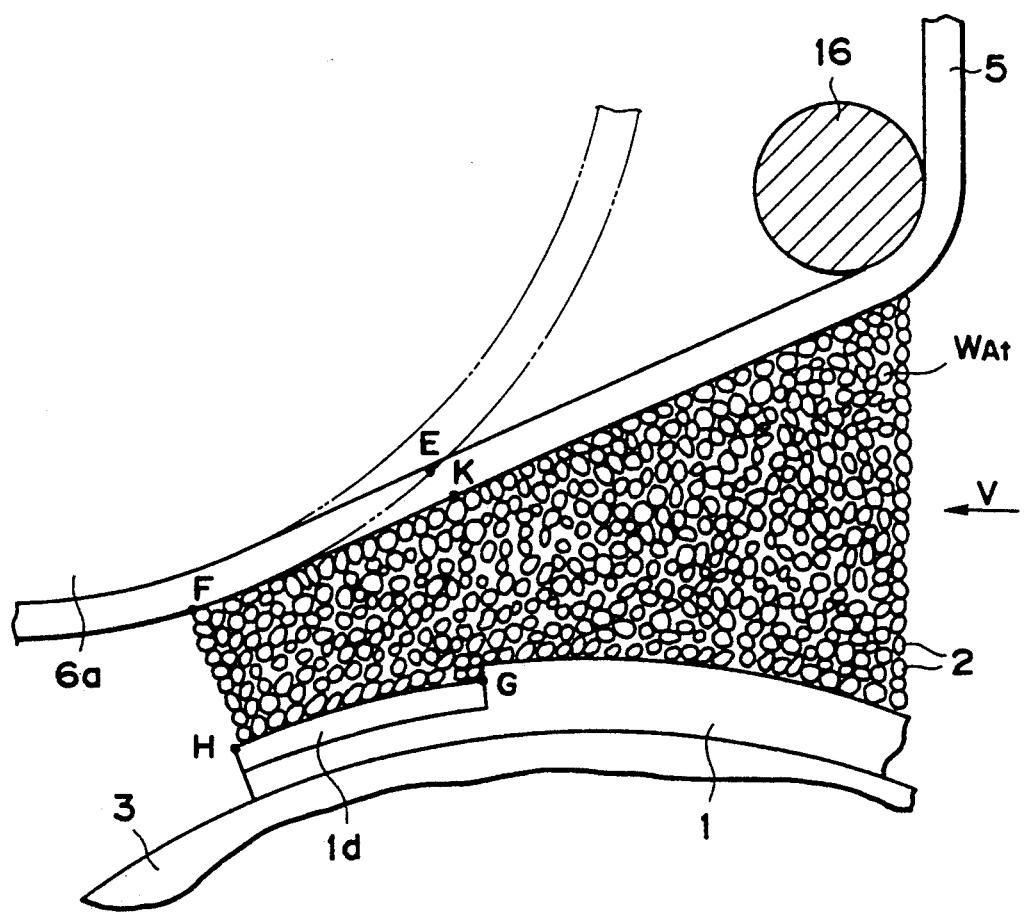
Figure 15:
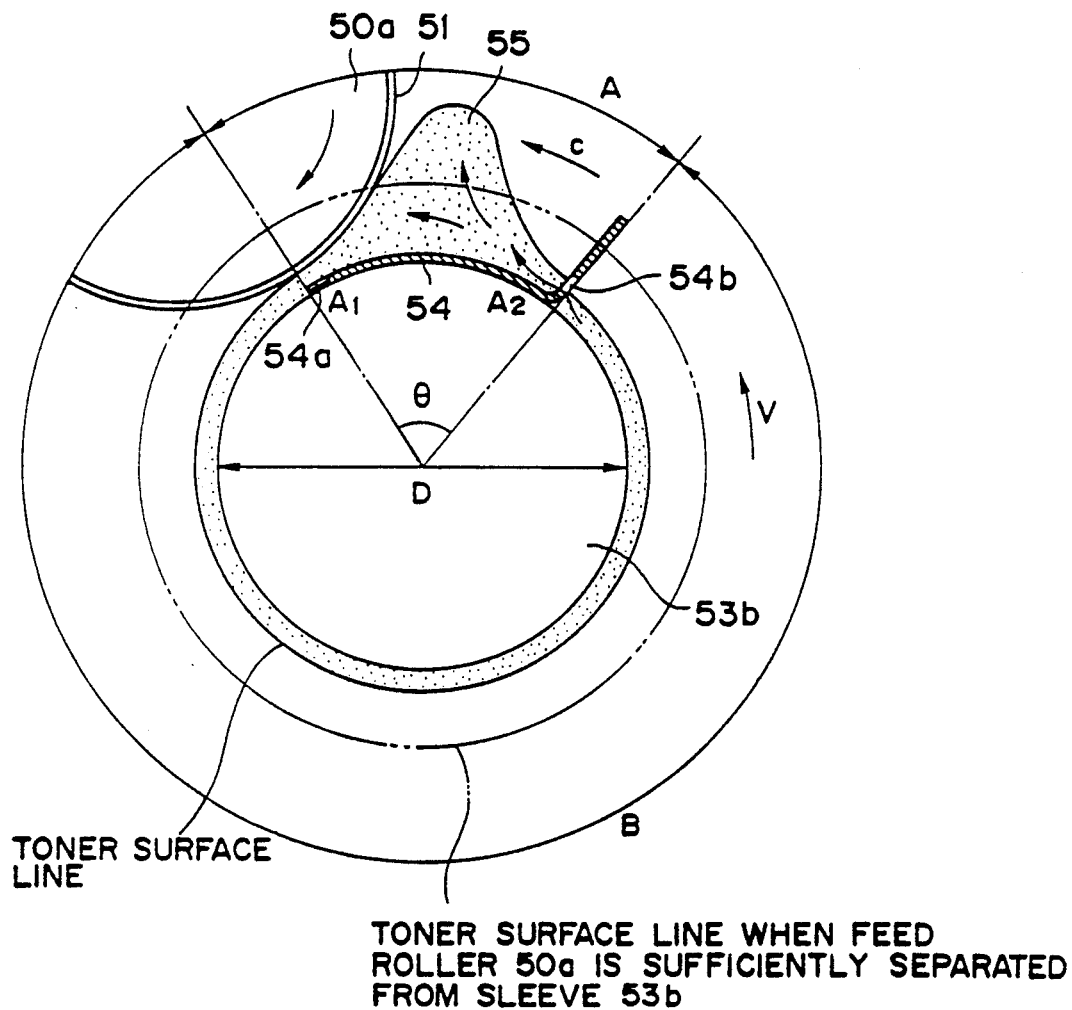
Figure 16:
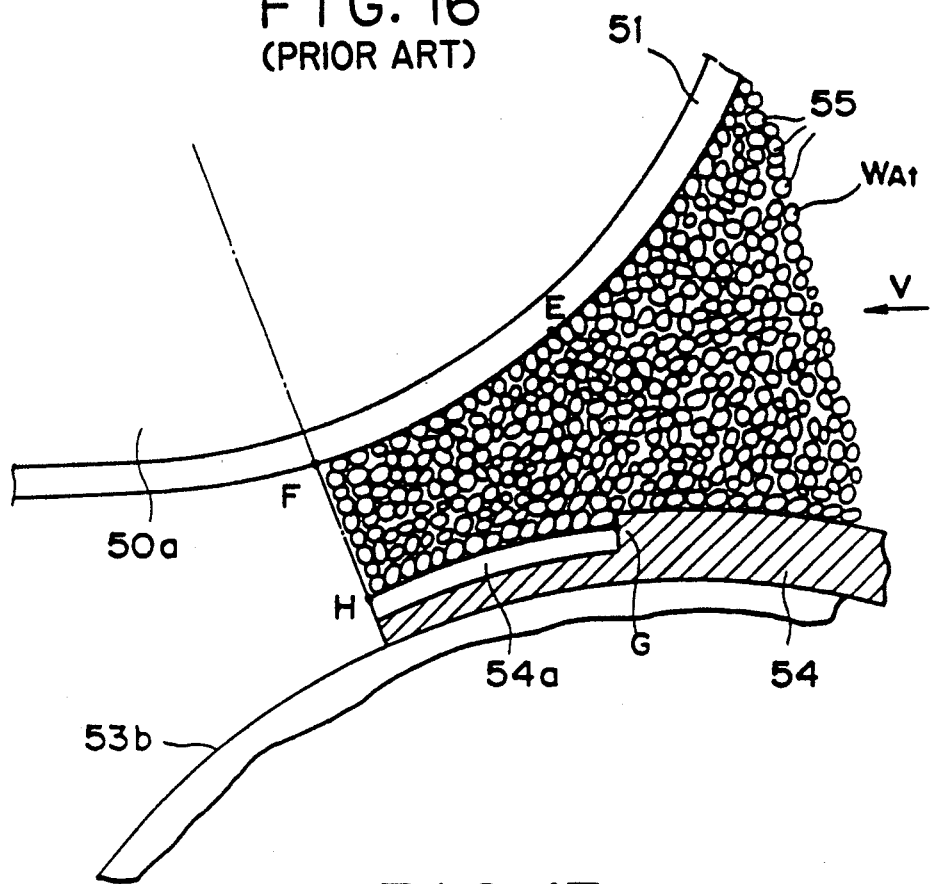
Figure 17:
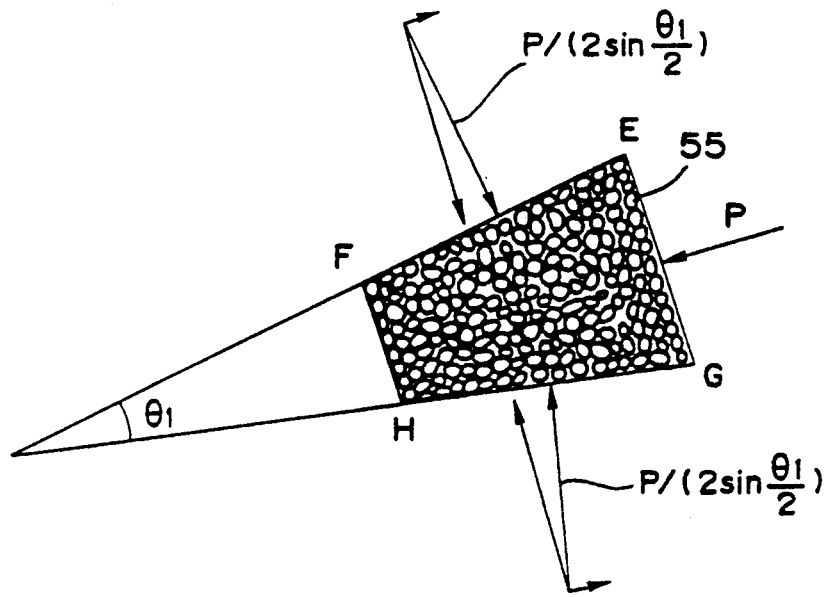
Figure 18:
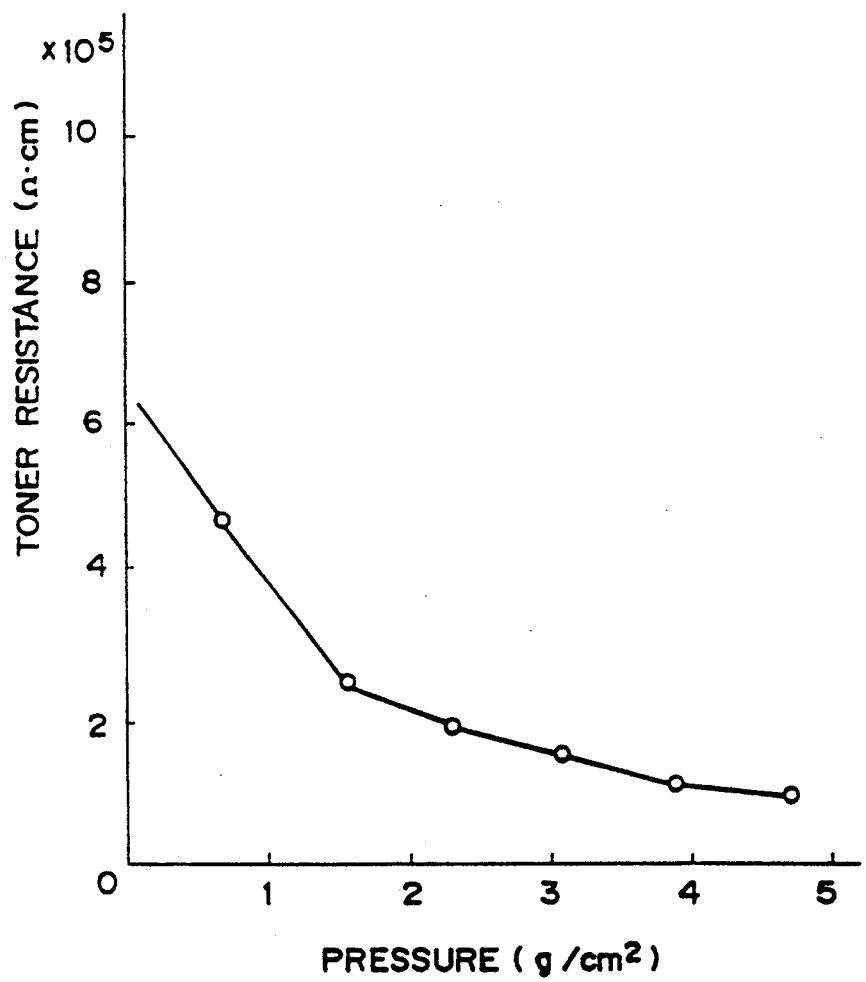

Incidentally, while the guide member 15 was a plate-shaped guide member, as shown in FIG. 11, in place of the plate-shaped guide member, a roller member 16 may be used to deviate a portion of the recording sheet 5 from the drive roller 6a just on this side of the image forming portion for regulating the shifting direction of the recording sheet 5 and to also indirectly regulate the amount of the toner flowing into the image forming portion, via the recording sheet 5. Also in the case shown in FIG. 11, the above-mentioned angle $\theta_2$ was smaller than the angle $\theta_1$ (in case of no guide roller member) by about 30%.

Next, a further embodiment of a guide means disposed in the vicinity of the image forming portion for regulating the flow-in of the toner will be explained with reference to FIGS. 12 and 13.

Figure 12:
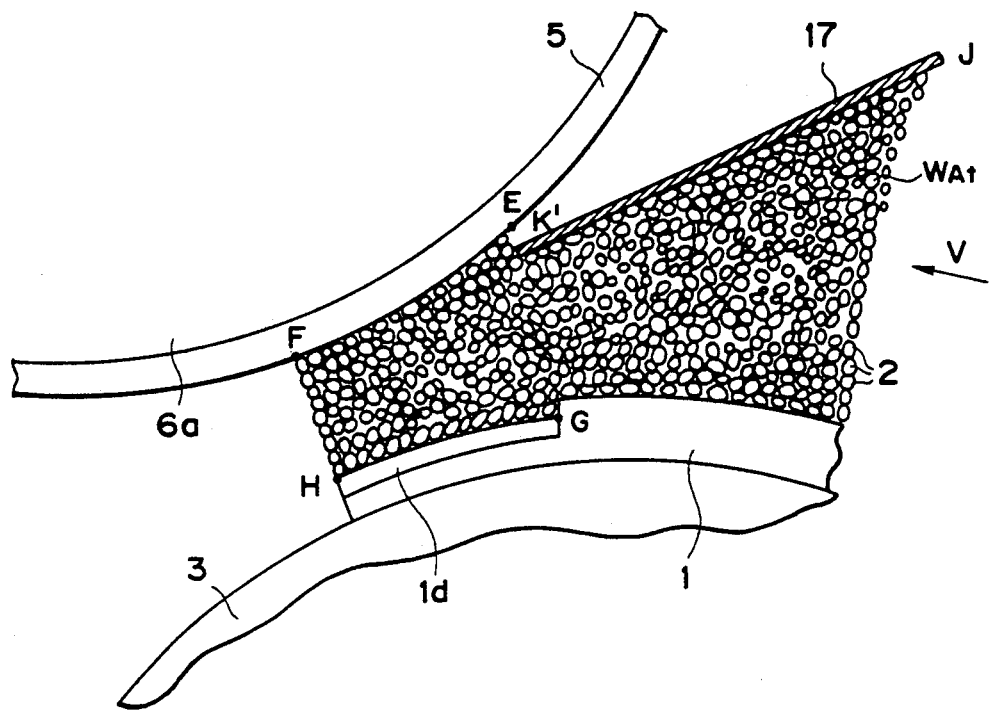
FIGS. 11, 12 and 13 are explanatory views showing another embodiment of an image forming portion.

In FIG. 12, a plate-shaped guide member 17 is disposed ahead of the image effective area EFGH and between the recording sheet 5 and the recording electrodes 1 and acts to directly direct the toner 2 moving at the speed N into the image effective area EFGH.

Starting and terminal points J' and K' of the guide member 17, and the terminal point F of the image effective area facing the recording sheet 5 are aligned with each other. And, an angle $\theta_2'$ between the line segments J'F and GH is smaller than $\theta_1$ by about 25-30%.

Figure 13:
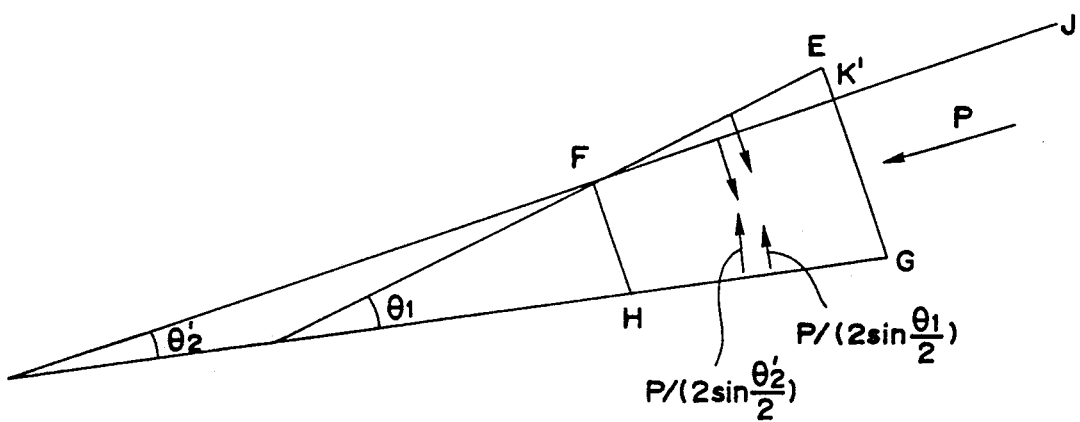

By adding the guide member 17, the behavior of the toner in the image effective area EFGH can be made to resemble case where the image effective area is reduced to an area K'FGH, as shown in FIG. 13. Accordingly, when the toner 2 in the image effective area K'FGH is subjected to the weight $W_{At}$ of the accumulated toner and a force P due to the toner feeding speed V from a direction perpendicular to the line segment K'G, the toner compressing forces $P/(2 \sin \theta_2'/2)$ acting on the toner from a direction perpendicular to the line segments K'F, GH become greater than the toner compressing forces $P/(2 \sin \theta_1/2)$ acting on the image effective area EFGH.

Therefore, as in the conventional example, since the conductor resistance $R_1$ of the toner chain is decreased to increase the electrostatic attraction force $F_E$ for attracting the toner 2 toward the recording sheet 5, it is possible to increase the image density.

As mentioned above, according to the present invention, since the guide means is provided in a vicinity of the image forming portion of the recording medium for regulating the inputting of the developer, it is possible to effectively compress the developer fed between the recording electrodes and the recording medium, without increasing the dimension of the recording medium at the recording position and the outer diameter of the developer shifting path. Thus, the image density can be increased, and the electric field generating means and the driving sources are not required to be bulky so that the driving sources can be small-sized to make it inexpensive, thus making the whole apparatus compact.

Further, it is possible to increase the distance of the gap between the recording medium and the recording electrodes within a range wherein the conductor resistance of the developer is below the regulated value (a decrease in the resistance of the developer due to the increase in the developer compressing force plus an increase in the resistance due to the increase in the gap distance $\leq$ regulated value), while keeping the developer feeding speed constant. Thus, since critical manufacturing accuracy of the drive feed roller, sleeve and the like is not required, the apparatus can be manufactured cheaply.

Further, when the longitudinal dimension of the apparatus is increased, although the gap distance between the recording medium and the recording electrodes must be increased, by maintaining the value of the conductor resistance of the toner chain increasing in proportion to the increase in the gap distance below the regulated value, it is possible to reduce the increase in the developer feeding speed and outer diameters of the drive feed roller and sleeve. Thus, the power sources for the rollers can be small-sized to reduce the power consumption, thus making the apparatus light-weight.

Further, since the area of the recording sheet 5 swept by the developer adhered to the sleeve after the image forming operation can be reduced, it is possible to reduce the unevenness in the image.

Next, the guide means associated with the present invention will further described. When the roller is used to shift the belt-shaped recording medium, in the recording position where the toner is accumulated, the volume of the accumulated toner created upstream of the recording position tends to quickly decrease because the profile of the recording medium is determined by the shape of the drive roller. However, by providing the above-mentioned guide means at an area where the toner is accumulated so that the volume of the accumulated toner can be changed linearly, the compressing condition of the toner may be improved. And, the guide means can act as an effective means for 25 compressing the developer and obtaining good image quality. Thus, the guide means associated with the present invention acts both to compress the developer and to reinforce the recording medium as shown in FIGS. 1 and 11. The guide means 17 shown in FIG. 12 has a function of guiding and compressing the developer. If the toner accumulation is created by the recording medium which is not lined (or supported at its back side), the developer will not be adequately compressed due to the deformation of the recording medium.

What is claimed is:

1. An image forming apparatus comprising:
   a movable endless recording medium guided by a pair of roller-shaped support members;
   a plurality of recording electrodes longitudinally arranged in confronting relation with one of said support members, for forming an image area on said recording medium in response to applied voltages;
   developer supplying means, disposed opposite the one of said support members for holding said electrodes thereon, and for supplying conductive powder developer to a gap formed between said recording electrodes and said recording medium; and
   a guide member disposed adjacent the one of said support members and upstream of said recording electrodes, for guiding and recording medium so that a distance between said recording medium and said developer supplying member gradually is narrowed at an entry portion to the gap, thereby to prevent an abrupt compression of the developer prior to supplying the developer to the gap formed between said recording electrodes and said recording medium.

2. An image forming apparatus according to claim 1, wherein said guide member has a flat configuration.

3. An image forming apparatus according to claim 1, wherein said guide member has a round configuration.

4. An image forming apparatus comprising:

a movable endless recording medium guided by pair of roller-shaped support members;

a plurality of recording electrodes longitudinally arranged in confronting relation with one of said support members, for forming an image area on said recording medium in response to applied voltages;

developer supplying means, disposed opposite the one of said support members, for holding said electrodes thereon, and for supplying conductive powder developer to a gap formed between said recording electrodes and said recording medium;

a guide member disposed in a vicinity of the one said support members and upstream of said recording electrodes, for guiding the developer into the gap, so that a distance between said guide member and said developer supplying means gradually is narrowed at an entry portion to the gap, thereby to prevent an abrupt compression of the developer prior to supplying the developer to the gap formed between said recording electrodes and said recording medium.

5. An image forming apparatus according to claim 4, wherein said guide member has a flat configuration.

* * * * *

UNITED STATES PATENT AND TRADEMARK OFFICE
CERTIFICATE OF CORRECTION

PATENT NO. : 5,255,018

DATED : October 19, 1993

INVENTOR(S) : Takeshi MATOBA

It is certified that error appears in the above-indentified patent and that said Letters Patent is hereby corrected as shown below: On the title page:

At [57] Abstract

Line 1, change "as" to --an--.

Column 1

Line 8, change "to a" to --to adhere to a--.

Column 4

Line 1, change "adhered" to --adhering--.

Column 5

Line 33, change "butylal" to --butyral--.

Column 6

Line 51, change "are" to --is--.

Column 7

Line 46, change "elapse" to --elapses--.

UNITED STATES PATENT AND TRADEMARK OFFICE
CERTIFICATE OF CORRECTION

PATENT NO. : 5,255,018

DATED : October 19, 1993

INVENTOR(S) : Takeshi MATOBA

It is certified that error appears in the above-indentified patent and that said Letters Patent is hereby corrected as shown below:

Column 8

Line 33, change "directions" to --direction--.
    Line 45, change "value a" to --value (a--.

Column 10

Line 32, delete "25".
    Line 53, change "members" to --members,--.
    Line 59, change "and" to --said--.

Column 11

Line 4, change "pair" to --a pair--.

Column 12

Line 3, change "one said" to --one of said--.

Signed and Sealed this

Seventh Day of June, 1994

Attest:

Attesting Officer

BRUCE LEHMAN

Commissioner of Patents and Trademarks